(12) United States Patent
Reichel et al.

(10) Patent No.: US 10,259,153 B2
(45) Date of Patent: Apr. 16, 2019

(54) PHOTOCHEMICALLY CURED MILLABLE POLYURETHANE RUBBER

(71) Applicant: TSE INDUSTRIES, INC., Clearwater, FL (US)

(72) Inventors: Curtis John Reichel, Tampa, FL (US); Kevin S. Fernandes, Valrico, FL (US); Colin S. Fernandes, New Port Richey, FL (US); Veselinka Mitevska, Seminole, FL (US)

(73) Assignee: TSE INDUSTRIES, INC., Clearwater, FL (US)

( * ) Notice: Subject to any disclaimer, the term of this patent is extended or adjusted under 35 U.S.C. 154(b) by 727 days.

(21) Appl. No.: 14/735,451

(22) Filed: Jun. 10, 2015

(65) Prior Publication Data
US 2016/0362552 A1    Dec. 15, 2016

(51) Int. Cl.
| | | |
|---|---|---|
| *B29C 47/00* | (2006.01) | |
| *C08K 5/00* | (2006.01) | |
| *B29C 35/08* | (2006.01) | |
| *B29K 75/00* | (2006.01) | |
| *B29K 105/24* | (2006.01) | |

(52) U.S. Cl.
CPC ........ *B29C 47/0004* (2013.01); *C08K 5/0025* (2013.01); *B29C 47/0021* (2013.01); *B29C 47/0088* (2013.01); *B29C 2035/0827* (2013.01); *B29C 2791/004* (2013.01); *B29K 2075/00* (2013.01); *B29K 2105/24* (2013.01); *B29K 2105/246* (2013.01); *C08L 2312/06* (2013.01)

(58) Field of Classification Search
CPC ............... B29C 47/0004; B29C 47/00; B29C 2791/004; B29C 47/0021; B29C 2035/0827; C08K 5/0025; B29K 2105/246; B29K 2105/24; B29K 2075/00; C08L 2312/06
See application file for complete search history.

(56) References Cited

U.S. PATENT DOCUMENTS 6,825,240 B2 * 11/2004 Wenning .............. C08G 18/672
                                                    522/81
6,921,454 B2 *  7/2005 Shi ........................ C08F 290/14
                                                    156/275.5

OTHER PUBLICATIONS

Schloegl, S. "Prevulcanization of Natural Rubber Latex by UV Techniques: A Process Towards Reducing Type IV Chemical Sensitivity of Latex Articles," Rubber Chemistry and Technology, V. 83, pp. 133-148.

* cited by examiner

*Primary Examiner* — Sanza L. McClendon
(74) *Attorney, Agent, or Firm* — Brooks Kushman P.C.

(57) ABSTRACT

Photocurable millable polyurethane gum compositions contain a millable polyurethane gum having ethylenic unsaturation, photocatalyst, and a low molecular weight crosslinker containing minimally two ethylenically unsaturated groups. The compositions can be used to continuously extrude profiles which retain their shape.

20 Claims, No Drawings

PHOTOCHEMICALLY CURED MILLABLE POLYURETHANE RUBBER

BACKGROUND OF THE INVENTION

1. Field of the Invention

The invention is directed to photochemically curable, millable polyurethane gums, and to methods for the preparation and for the use thereof.

2. Background of the Invention

Early attempts to replace natural rubber latex, e.g. that derived from *Hevea brasiliensis*, with synthetic rubbers were problematic, and numerous synthetic rubbers such as those based on butadiene and styrene were initially unsuccessful. Natural rubber consists predominately of naturally polymerized isoprene units, and the physical and chemical properties of natural rubber, coupled with the use and modification of natural latex dating back to aboriginal times, has resulted in a wide variety of uses of natural rubber, in both the vulcanized and unvulcanized states. However, natural rubber is deficient in numerous applications, such as those requiring greater hardness and abrasion resistance. It is for many of these applications that polymers have been sought which can modify the rubber properties or replace natural rubber in its entirely. Millable polyurethane rubber has been a successful modifier and replacement.

Millable polyurethane rubber is distinctly different from other types of polyurethanes. The first polyurethanes were invented by Dr. Otto Bayer in 1937, and since that time, have experienced enormous growth in both technology and applications. For example, slab polyurethane foam is produced in enormous quantities throughout the world for use, for example, in seating products. In the automotive industry, molded polyurethane foams are used for the same purposes. Thermoplastic polyurethane, or "TPU" has been developed for use in many products, one of which include the jounce bumpers in modern automotive suspension systems. Spandex™ elastomers have a wide range of uses, including stretch fabrics in the clothing industry. In the 1950s, millable polyurethane rubbers were touted especially for use in producing tires for vehicles. Early players in this latter market included Bayer, U.S. Rubber (which later became Uniroyal) and DuPont. In the 1960s, research and production expanded to other companies such as General Tire, Goodyear, Michelin, and American Cyanamid, as well as Witco and Thiokol.

Polyurethanes are produced by the reaction of a di- or polyisocyanate with a glycol or hydroxyl-functional polyol, or both. The hydroxyl-functional polyol may be a polyether polyol or a polyester polyol. Millable polyurethane rubber is different from other polyurethanes which are either stoichiometrically indexed or over-indexed. In order to provide a millable gum polymer product, millable polyurethane polymers are under-indexed, i.e. contain an excess of hydroxyl functionality as compared with the amount of isocyanate functionality. Preparation of millable polyurethane polymers, or "gums" proved to be difficult, resulting in very inconsistent materials. Largely for this reason, the majority of manufacturers ceased production of millable polyurethanes in the 1970s. However, millable polyurethane still constitutes an important area of technology due to the chemical and physical properties which can be obtained upon vulcanization of the millable polyurethanes. Vulcanization can be divided into two categories: peroxide cure and sulfur cure.

In peroxide cured millable polyurethanes, an organic peroxide is milled with the polyurethane rubber at a temperature where the organic peroxide is substantially stable against decomposition. Following milling of the rubber, peroxide, and other ingredients such as antioxidants, fillers, pigments, etc., the milled rubber product is molded into the shape of the final article and cured at elevated temperature. At the elevated temperature cure, the organic peroxide decomposes to form free radicals which initiate cross-linking. In sulfur cured millable polyurethanes, sulfur or sulfur compounds such as thiuram disulfide and other ingredients are milled into the polyurethane rubber. Following molding, vulcanization then occurs at elevated temperature, by much the same process which has been used to produce vulcanized rubber since the introduction of vulcanization by Charles Goodyear many years ago.

The difficulty of producing millable polyurethane rubber within specification in a consistent manner has largely been overcome by the two remaining principal producers of millable polyurethane rubber: Rhein Chemie, and TSE industries, the latter being the world's largest producer of millable polyurethane rubber. However, the production of articles from millable polyurethanes has remained problematic, in part due to the tackiness and low physical strength of molded articles produced from the millable gums prior to cure. In addition, the necessity to carefully monitor the temperature during milling, the cost of the ovens necessary for the high temperature cure or "vulcanization", and the time which vulcanization requires, has also limited applications of millable polyurethane rubber. This is especially the case with continuously produced molded profiles, which have been impossible to produce, despite a long felt need for such products and the maturation of the technology over the decades.

Thus, there has been a long felt need to provide a millable polyurethane rubber gum material which can be more easily compounded, which can avoid totally or at least mitigate increased production time and expense related to high temperature vulcanization, and can be used to produce molded profiles by a continuous process. Yet despite decades of research directed to improvements in these factors, these goals have not been met.

SUMMARY OF THE INVENTION

It is now been surprisingly and unexpectedly discovered that a millable polyurethane polymer material can be produced which is capable of photochemically curing. The millable polyurethane polymer comprises a generally under-indexed polyurethane polymer of millable molecular weight, produced from the reaction of a di- or polyisocyanate with one or more dihydroxy-functional compounds, at least one of which contains ethylenic unsaturation. The photochemically-curable millable gums are useful for the continuous production of profiles, for example by extrusion.

DETAILED DESCRIPTION OF THE PREFERRED EMBODIMENTS

The millable polyurethanes of the present invention are of relatively low molecular weight, characterized by a Mooney viscosity of from 30 to 70, more preferably from 40-60, and most preferably from 45-55 Mooney viscosity units, measured at 100° C. by the method of ASTM D-1646. These millable polyurethanes are prepared by the reaction of a di- or polyisocyanate with bis(hydroxyl)-functional compounds, at least one of which contains ethylenic unsaturation. The polyurethanes are generally under-indexed to achieve these properties.

The "index" of a polyurethane is the stoichiometric ratio of isocyanate ("NCO") groups to hydroxyl groups, multiplied by 100. Thus, a polyurethane wherein the stoichiometry is 1:1 has an isocyanate index of 100. Such polyurethanes are generally of quite high molecular weight, and are unsuitable for millable polyurethanes. An example of such a polyurethane is thermoplastic polyurethane, or TPU. Near 1:1 stoichiometry generally results in high molecular weight. Over-indexed polyurethanes have an isocyanate greater than 100, and a correspondingly lesser molecular weight. However, the excess isocyanate groups are quite reactive, and as a result, such products are not useful as millable polyurethanes. Crosslinking or chain extension of such products during cure generally results in high levels of physical properties.

Millable polyurethane gums are generally under-indexed, with an isocyanate index <100, preferably 90-99, and more preferably 95-98.5. Such products have little "green strength" due to their lower molecular weight and lack of reactive groups. Mechanical strength is achieved through vulcanization, resulting in crosslinking. For example, under-indexed polyurethane millable gums prepared from methylenediphenylene diisocyante (MDI) are peroxide-vulcanizable through abstraction of hydrogen from the MDI methylene groups by free radicals. In contrast, sulfur vulcanizable millable polyurethane rubbers must include aliphatic unsaturation.

Natural rubber, while chemically quite different from millable polyurethane rubber, suffers from processing and use difficulties. For example, one important use of natural rubber is the coagulation of an aqueous latex onto a hand-shaped mandrel, followed by vulcanizing with sulfur compounds, to provide "latex" gloves. However, it has recently become known that such gloves often provoke an allergic response. In some cases, this response was due to compounds contained in the natural latex per se, but in many cases, it was found to be dependent on the use of conventional sulfur compounds for vulcanization ("Type IV allergenic response"). In "Prevulcanization Of Natural Rubber Latex By UV Techniques: A Process Towards Reducing Type IV Chemical Sensitivity Of Latex Articles," RUBBER CHEMISTRY AND TECHNOLOGY, V. 83, pp. 133-148, it was proposed to add non-conventional sulfur compounds such as trimethylolpropane-tris(3-mercaptopropionate) to an aqueous latex and irradiate the latex. Partial crosslinking is said to occur, involving a thiol-ene reaction, and dipped latex articles subsently dried and cured at 120° C. were prognosticated to be Type IV non-allergenic. Such partial crosslinking, especially in aqueous latex form, has no relevance to photocurable neat polyurethanes, which are quite different chemically and physically.

The millable polyurethane materials of the present invention must be prepared from at least one dihydroxy-functional compound having ethylenic unsaturation, generally in conjunction with customary dihydroxy-functional compounds. The customary dihydroxy-functional compounds may be "monomeric," i.e. a simple glycol such as ethylene glycol, propylene glycol, cyclohexane dimethanol, 1,4-butane diol, or 1,6-hexane diol; oligomeric, such as di-, tri- or tetraethylene glycol or di-, tri- or tetrapropylene glycol; or polymeric, for example polyoxyethylene glycols, polyoxypropylene glycols, polytetramethylene glycols (poly-THF), hydroxyl-functional polyester polyols, and the like.

At least one isocyanate-reactive component must contain aliphatic unsaturation. The at least one isocyanate reactive component containing unsaturation may be of low molecular weight, e.g. monomeric, such as 1,4-but-2-ene glycol, glycerol monoallyl ether, glycerol monoacrylate, glycerol monomethacrylate, or bis(2-hydroxyethyl) fumarate, or may be polymeric, for example an unsaturated polyester containing repeating groups derived from one of the afore-mentioned diols with a dicarboxylic acid, or containing repeating groups derived from maleic acid, and particularly from maleic anhydride. Such polyesters containing "in-chain" unsaturated groups are known, and are used, for example in curable unsaturated polyester resins, generally also containing styrene. On a weight percentage basis, the percentage of unsaturated groups, calculated as allyl groups, is from 0.2 to 5 wt. %, preferably from 0.4 to 3 wt. %, and more preferably from >0.4 to <2 wt. %. Amounts of from 0.5 to 1.8 wt. % have proven to be particularly suitable. The weight percentages of other unsaturated groups can easily be calculated based on these values.

The particular isocyanate-reactive components can be selected in view of the physical and chemical properties desired. Thus, for example, the ratio of short chain diols to longer chain polyols may be used to alter crystallinity and physical properties such as ultimate tensile strength and elongation at break. The greater the amount of low molecular weight diols relative to polyols, for example, the higher the tensile strength and the lower the elongation, in general.

The most preferred millable polyurethane polymers of the present invention are those based on poly-THF as one isocyanate reactive component, and a low molecular weight diol bearing pendent ethylenic unsaturation, e.g. glycerol monoallyl ether, as a further isocyanate-reactive component. The resulting polymer contains pendent allyl ether groups along the resulting polymer chain.

Alternatively, millable polyurethane polymers may contain hydroxyl-functional polyesters, or "polyester polyols" as an isocyanate-reactive component. Such polyester polyols are well known, and commercially available. The use of polyester polyols can impart useful solvent resistance in some applications, and can also alter physical properties such as tensile strength, elongation, and modulus. However, some decreased resistance to degradation by hydrolysis may be observed. Saturated polyester polyols must be used in conjunction with an unsaturated isocyanate-reactive component, for example, one such as glycerol monoallyl ether, to provide ethylenic unsaturation.

Alternatively, unsaturated polyester polyols may be used, alone or in conjunction with other isocyanate-reactive components such as conventional polyoxyalkylene glycols, and optionally with diols which can supply pendent ethylenic unsaturation. Unsaturated polyester polyols are well known and commercially available. Many such polyols are produced by including maleic anhydride as one of the polymerizable monomers in the polyesterification. Such unsaturated polyester polyols contain in-chain as opposed to pendent unsaturation.

The di- or polyisocyanates useful in the preparation of the millable polyurethane materials of the invention may include any isocyanate useful in the production of polyurethane polymers. Disocyanates are particularly preferred, as the use of tri- or higher functionality isocyanates such as polymeric MDI ("PMDI") or triisocyanatoisocyanurate can easily induce such a large amount of branching and/or crosslinking so as to cause the polyurethanes to no longer be millable. Thus, tri- or higher (poly) isocyanates should be used in amounts of ≤30 mol percent based on total isocyanate, more preferably, in order of increasing preference, ≤25 mol percent, ≤20 mol percent, ≤15 mol percent, ≤10 mol percent, and ≤5 mol percent. Use of polyisocyanates in amounts of less than 5 mol percent is most preferred, and avoidance of polyisocyanates altogether is particularly preferred.

The isocyanates may be aliphatic, including cycloaliphatic, or aromatic, including arylalkylene isocyanates. Examples of aliphatic isocyanates include 1,4-diisocyanatobutane, 1,6-diisocyanatohexane, 1,8-diisocyanatooctane, 1,2-, 1,3-, and 1,4-diisocyanatocyclohexane, 2,4-, 3,5-, and 2,6-diisocyanatomethylcyclohexane, 2,2'-, 2,4'- and 4,4'-methylene dicyclohexylene diisocyanate, isophoronediisocyanate, and the like. Examples of aryl isocyanates include 2,4- and 2,6-toluene diisocyanate, 2,2'-, 2,4'-, and 4,4'-methylene diphenylene diisocyanate (MDI), polymeric MDI, triisocyanatoisocyanurate, m-tetramethylenexylylene diisocyanate, etc. Preferred isocyanates include 4,4'-MDI and 4,4'-methylene dicyclohexylene diisocyanate ($H_{12}$MDI). Modified isocyanates such as carbodiimide, urea, urethane, and uretdione modified di- and polyisocyanates, preferably diisocyanates, are also useful.

The reaction of the isocyanate and isocyanate-reactive components may be catalyzed or uncatalyzed, preferably catalyzed. Conventional tin and bismuth catalysts which promote urethane group formation are preferred. A large number of catalysts are known and commercially available. The reaction generally occurs neat, i.e. without solvents, at temperatures ranging from room temperature or below to 90° C. or higher, preferably 30° C. to 90° C., and more preferably 50-90° C. The reaction is preferably blanketed with inert gas, most preferably nitrogen. The methods of preparation are conventional, and generally known.

For preparation of the inventive millable polyurethane gum materials, the millable polyurethane polymer just described, bearing in-chain or pendent ethylenic unsaturation, preferably pendant unsaturation, and most preferably pendant oxyallyl groups, is compounded with further necessary and optional ingredients, preferably on a three roll mill, or in a mixing chamber such as a single or twin screw extruder, a Banbury mixer, or the like. The mixing takes place at elevated temperature where the polyurethane has the consistency of a gum.

A necessary ingredient is a photocatalyst. Suitable photocatalysts are known in the art of photochemical free radical generation, for example. As photoinitiators it is possible to use photoinitiators known to the skilled worker, examples being those specified in ADVANCES IN POLYMER SCIENCE, Volume 14, Springer Berlin 1974 or in K. K. Dietliker, CHEMISTRY AND TECHNOLOGY OF UV AND EB FORMULATION FOR COATINGS, INKS AND PAINTS, Volume 3; Photoinitiators for Free Radical and Cationic Polymerization, P. K. T. Oldring (Eds.), SITA Technology Ltd, London. These photoinitiators release free radicals on exposure to light and are able to initiate a free-radical reaction, such as free-radical polymerization.

Suitable non-limiting examples of photocatalysts include phosphine oxides, benzophenones, α-hydroxy-alkyl aryl ketones, thioxanthones, anthraquinones, acetophenones, benzoins and benzoin ethers, ketals, imidazoles, phenylglyoxylic acids, and mixtures thereof.

Phosphine oxides are, for example, mono- or bisacylphosphine oxides, such as bis(2,4,6-trimethylbenzoyl)phenylphosphine oxide, as described for example in EP-A 7 508, EP-A 57 474, DE-A 196 18 720, EP-A 495 751 or EP-A 615 980, examples being 2,4,6-trimethylbenzoyldiphenylphosphine oxide, ethyl 2,4,6-trimethylbenzoylphenyl-phosphinate or bis(2,6-dimethoxybenzoyl)-2,4,4-trimethylpentylphosphine oxide; benzophenones are, for example, benzophenone, 4-aminobenzophenone, 4,4'-bis(di-methylamino)benzophenone, 4-phenylbenzophenone, 4-chlorobenzophenone, Michler's ketone, o-methoxybenzophenone, 2,4,6-trimethylbenzophenone, 4-methylbenzophenone, 2,4-dimethylbenzophenone, 4-isopropylbenzophenone, 2-chlorobenzophenone, 2,2'-dichlorobenzophenone, 4-methoxybenzophenone, 4-propoxybenzophenone or 4-butoxybenzophenone; α-hydroxy-alkyl aryl ketones are, for example, 1-benzoylcyclohexan-1-ol (1-hydroxy-cyclohexyl phenyl ketone), 2-hydroxy-2,2-dimethylacetophenone (2-hydroxy-2-methyl-1-phenylpropan-1-one), 1-hydroxyacetophenone, 1-[4-(2-hydroxyethoxy)phenyl]-2-hydroxy-2-methyl-1-propan-1-one or a polymer comprising 2-hydroxy-2-methyl-1-(4-isopropen-2-ylphenyl)propan-1-one in copolymerized form (Esacure® KIP 150); xanthones and thioxanthones are, for example, 10-thioxanthenone, thioxanthen-9-one, xanthen-9-one, 2,4-dimethylthioxanthone, 2,4-diethylthioxanthone, 2,4-diisopropylthio-xanthone, 2,4-dichlorothioxanthone or chloroxanthenone;

anthraquinones are, for example, p-methylanthraquinone, tert-butylanthraquinone, anthraquinonecarboxylic esters, benz[de]anthracen-7-one, benz[a]anthracene-7,12-dione, 2-methylanthraquinone, 2-ethylanthraquinone, 2-tert-butylanthraquinone, 1-chloroanthraquinone or 2-amylanthraquinone;

acetophenones are, for example, acetophenone, acetonaphthoquinone, valerophenone, hexanophenone, .alpha.-phenylbutyrophenone, p-morpholinopropiophenone, dibenzosuberone, 4-morpholinobenzophenone, p-diacetylbenzene, 4'-methoxyacetophenone, .alpha.-tetralone, 9-acetylphenanthrene, 2-acetylphenanthrene, 3-acetylphenanthrene, 3-acetylindole, 9-fluorenone, 1-indanone, 1,3,4-triacetylbenzene, 1-acetonaphthone, 2-acetonaphthone, 2,2-dimethoxy-2-phenylacetophenone, 2,2-diethoxy-2-phenylacetophenone, 1,1-dichloroacetophenone, 1-hydroxyacetophenone, 2,2-diethoxyacetophenone, 2-methyl-1-[4-(methylthio)phenyl]-2-morpholinopropan-1-one, 2,2-dimethoxy-1,2-diphenylethan-2-one or 2-benzyl-2-dimethylamino-1-(4-morpholinophenyl)butan-1-one;

benzoins and benzoin ethers are, for example, 4-morpholinodeoxybenzoin, benzoin, benzoin isobutyl ether, benzoin tetrahydropyranyl ether, benzoin methyl ether, benzoin ethyl ether, benzoin butyl ether, benzoin isopropyl ether or 7H-benzoin methyl ether;

ketals are, for example, acetophenone dimethyl ketal, 2,2-diethoxyacetophenone, or benzil ketals, such as benzil dimethyl ketal.

Phenylglyoxylic acids are described for example in DE-A 198 26 712, DE-A 199 13 353 or WO 98/33761.

Photoinitiators which can be used additionally are, for example, benzaldehyde, methyl ethyl ketone, 1-naphthaldehyde, triphenylphosphine, tri-o-tolylphosphine or 2,3-butane-dione. Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethyl-pentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethyl-pentylphosphine oxide and 1-hydroxycyclohexyl phenyl ketone, 2,4,6-trimethylbenzoyl-diphenylphosphine oxide and 2-hydroxy-2-methyl-1-phenylpropan-1-one, 2,4,6-trimethylbenzophenone and 4-methylbenzophenone, or 2,4,6-trimethylbenzophenone and 4-methylbenzophenone and 2,4,6-trimethylbenzoyldiphenylphosphine oxide.

Amino-containing photoinitiators may also be used, examples being 4-aminobenzophenone, 4,4'-bis(dimethylamino)benzophenone, 2-benzyl-2-dimethylamino-1-(4-morpholinophenyl)butan-1-one or 4-morpholinodeoxybenzoin.

The amount of photocatalyst is an amount effective to induce crosslinking of the millable polyurethane materials, for example from 0.05 weight percent to about 5 weight percent, more preferably from 0.1 to 2 weight percent, and in particular from 0.2 to 1 weight percent. A single photoinitiator or a mixture of photoinitiators may be used.

A necessary component in the photocurable millable gums of the invention is an ethylenically unsaturated crosslinking agent. Such crosslinking agents are generally low molecular weight compounds which contain two or more ethylenically unsaturated groups. Examples are glycerol diallyl ether, 1,6-hexanediol di(meth)acrylate, triallylisocyanurate, trimethylolpropane di(meth)acrylate, trimethylolpropane tri(meth)acrylate, glycerol di(meth)acrylate, glycerol tri(meth)acrylate, propoxylated glycerol triacrylate, 1,2-divinyltetramethyldisiloxane, divinylbenzene, and the like. The molecular weight of the crosslinkers is preferably below 2000 Da, more preferably below 1000 Da, and most preferably below 500 Da. The amount of crosslinker is at least partially dependent upon the amount of ethylenic unsaturated groups in the millable polyurethane material, and may range from very small amounts, i.e. 0.01 weight percent, to 0.1 to 15 weight percent (based on the weight of crosslinker and millable polyurethane material), preferably 1 to 12 weight percent, more preferably 2 to 10 weight percent, and most preferably 5-10 weight percent.

Optional ingredients include plasticizers, mold release agents, lubricants, antioxidants, UV absorbers, flame retardants, dyes, pigments, reinforcing and non-reinforcing fillers, and fiber reinforcement. It is noted that UV absorbers must be absent, or used in moderation, since if used in excessive proportions, UV light curing may be impacted negatively. Alternatively, a more powerful UV light source may be used for curing, or one having an output over a wavelength range within the UV at which the UV absorber has reduced absorbance.

By reinforcing fillers is meant organic, i.e. polymeric, or inorganic fillers having mean weight average particle sizes below 1 μm, preferably in the range of 20 nm to 500 nm. Such fillers generally increase the mechanical properties of the cured product. Reinforcing fillers should not be confused with fiber reinforcement, which may also be used, but which functions in a completely different manner. Examples of reinforcing fillers include pyrogenic (fumed) metal oxides such as alumina, titania, ceria, and silica; colloidal metal oxides, e.g. colloidal alumina or silica; carbon black and acetylene black; metal hydroxides such as aluminum hydroxide, glass microbeads, glass microbaloons, polymer microbaloons, ground limestone, talc, clay, and the like. The amount of filler is tailored for the particular end use, and may range from 0 weight percent to about 20 weight percent or more based on the total weight of the milled composition. Non-reinforcing fillers may be of the same chemical constituents as reinforcing fillers, but of larger mean particle size, >1 μm, preferably in the range of 2 μm to 500 μm.

Non-photocurable crosslinkers can also be added. These consist preferably of the di- and polyisocyanates previously discussed, in amounts of from 0.05 to 5 weight percent, preferably 0.1 to 1 weight percent.

Following thorough mixing (milling) the millable polyurethane gum material is molded into the desired shape. Any convenient type of molding may be used, including injection molding, press molding, extrusion, including sheet extrusion, and the like. If molding takes place at reasonably low pressures, the mold may be constructed of UV-transparent material, for example in the form of a quartz, fused silica, or sapphire window, and may be irradiated with UV light to fully or partially cure within the mold, or during passage through the mold.

A preferred application of the inventive millable polyurethane materials is the extrusion of hollow tubing and other continuous shapes, regardless of cross-section, such as bars, rods, L-channels, U-channels, square tubing, and the like. In the past, such products have been unable to be produced from millable polyurethanes, in particular due to deformation from the originally extruded shape due to lack of green strength, and to initial reduction of viscosity in a curing oven, before sufficient crosslinking using peroxide or sulfur could take place.

Curing is effected by irradiation with visible or UV light, depending upon the excitation wavelength of the photocatalyst, most often, UV light. Such UV light may be produced by any known source, including low, medium, and high pressure mercury vapor lamps, xenon lamps, quartz-halogen lamps, or lasers operating in the short wavelength portion of the spectrum, particularly in wavelengths from 180-400 nm. One example of a suitable UV light source is a Zeta 7401 UV chamber, having a pulsed Xeon lamp which emits UVA, UVB, UVC, and visible light, with an output of up to 405 W/cm$^2$. The time of irradiation varies with the nature and type of millable polyurethane material, type and concentration of crosslinkers, type and concentration of fillers, type and power of light source, etc. However, the time necessary can easily be determined in a single run of extruded product, for example, by varying the irradiation time and measuring the resulting physical properties. Irradiation time is sufficient when the desired properties have been attained, or when additional exposure fails to significantly alter these properties.

Irradiation preferably takes place in a room temperature environment, or the environment established in proximity to the molding process. The temperature of the molded part may be that of the part just following molding or extrusion, or the part may be cooled prior to irradiation. No thermal cure is necessary. The preferred compositions are not dual cure systems. However, it would not depart from the spirit of the invention to also mill in a peroxide or sulfur compound to produce a dual cure system. This, however, is not preferred, as it detracts from the processing and cost benefits of the invention. The compositions are preferably free of peroxides, and free of sulfur and organic sulfur compounds which induce vulcanization. It is noted that sulfur-containing antimicrobials such as isothiazolinones do not fall within the latter category, and may be added to impart microbial resistance.

Photocuring may, in some cases, be initiated prior to or during the molding process, the initial crosslinking being insufficient to produce a fully crosslinked material. Crosslinking proceeds further following irradiation.

For the continuous molding of profiles, a peroxide catalyst may additionally be milled into the millable polyurethane polymer. Amounts of peroxide, such as, but not limited to peroxides such as dicumyl peroxide, may range from 0.01 wt. % to 1 wt. % based on the total weight of the photocurable millable polyurethane gum composition, more preferably 0.05 to 0.5 wt. %, and most preferably 0.1 to 0.4 wt. %. In this case, following initial photocuring, which fixes the shape of the molded profile, the fully or partially photocured product may be passed through a heating tunnel or "oven" to induce peroxide crosslinking. The use of such dual cure products may allow higher values of physical properties to be obtained. An advantage of this process is that due to the initial photo-induced crosslinking, the shape of the profile can be maintained, even though peroxide crosslinking takes place at elevated temperatures, for example 100° C. to 240° C., preferably 120° C. to 180° C., where conventional peroxide-cured products sag and alter their profile prior to development of sufficient crosslinking. Moreover, the "furnace" can be a continuous tubular furnace due to the generally small cross-sectional size of the profile, for example, but not by limitation, having a cross-sectional area of 1 mm$^2$ to 100 cm$^2$. Such ovens are much more economical to produce, operate, and maintain as compared to conventional curing ovens.

The photocured products may be produced with a wide range of physical properties. The Shore A hardness, for example, may be easily adjusted by selecting an appropriate Mooney viscosity for the millable polyurethane polymer and adjusting the amount and functionality of the low molecular weight crosslinker. The Shore A hardness (ASTM D2240) may, for example, range from Shore A 30 or lower to Shore A 80 or higher. The Shore A hardness is preferably 40-75, more preferably 50-70, and most preferably 55-70.

The elongation may be similarly adjusted, as may also the tensile strength. For example, the higher the amount of crosslinker with a given millable polyurethane polymer, in general, the lower the elongation and the higher the tensile strength. Elongation is generally lower and tensile strength higher, as the functionality (number of ethylenically unsaturated groups per molecule) increases. Elongation is preferably in the range of 250% (ASTM D412) to 800%, more preferably 300 to 600%, and most preferably >300 to <600%. Tensile strength is preferably greater than 1000 psi (ASTM D412), more preferably greater than 1400 psi, yet more preferably greater than 1500 psi. The upper value of tensile strength may be linked to the nature of the millable polyurethane polymer, those based on polyester polyols generally having higher tensile strength than their polyether-based analogs. The tensile strength may range upwards of 3500 psi, for example. Stress at 100% elongation (100% modulus) is preferably in the range of 200-600 psi (ASTM D412), more preferably 250-400 psi, and the Die C tear strength (ASTM D624) is preferably within the range of 100 pli to 300 pli, more preferably 125 pli to 250 pli.

Having generally described this invention, a further understanding can be obtained by reference to certain specific examples which are provided herein for purposes of illustration only and are not intended to be limiting unless otherwise specified.

In the Examples which follow, the following abbreviations are used:

| Component | Function |
|---|---|
| Millathane ® 97-45 | Millable polyurethane polymer containing unsaturation derived from glycerol monoallyl ether, Mooney viscosity of 45 |
| Millathane ® 97-60 | Millable polyurethane polymer H$_{12}$-MDI and based on PTME6, containing unsaturation derived from glycerol monoallyl ether, Mooney viscosity of 60 |
| Stearic Acid | Processing Aid - Lubricant |
| Wacker HDK ® N20 | Reinforcing Fumed Silica Filler |
| Carbowax ™ 3350 | Processing Aid - Internal Lubricant |
| AC 617A | Processing Aid - Internal Lubricant |
| SR231 | Difunctional Acrylate Crosslinker |
| SR350 | Trifunctional Acrylate Crosslinker |
| Irganox ® 1010 | Antioxidant |
| Irgacure ® 819 | UV Initiator |
| Irgacure ® BP | UV Initiator |
| Vanfre ™ AP3 | Process Aid - Mold Lubricant |
| Paraplex 659 | Intermediate m.w. polyester plasticizer |
| Varox DEPH | Organic peroxide vulcanization catalyst |
| Tinuvin 765 | Liquid hindered amine light stabilizer |

Example 1

100 parts by weight of Millathane 97-60, available from TSE Industries, is milled together with crosslinkers, photoinitiators, and other components at a temperature of 25-60° C. on a Sherman Rubber machinery Co. 8×16 two roll mill, until homogenously blended. The formulation is set forth in Table 1 below. Test plaques were press molded and exposed for 1 minute to light from a pulsed Xenon lamp described previously. Physical properties were measured and set forth in Table 2. As comparative examples, standard millable rubbers were employed. Comparative Example C3 (see Table 2) is a further, peroxide cured millable polyether-based polyurethane rubber, containing 0.4 wt. % peroxide and 3 wt. % SR 231.

TABLE 1

| Component | Comp. Ex. C1 | Example 1 | Example 2 | Example 3 |
|---|---|---|---|---|
| Millathane ™ 97-60 | 100.0 | 100.0 | — | — |
| Millathane ™ 97-45 | — | — | 100.0 | 100.0 |
| Stearic Acid | 0.25 | 0.25 | 0.50 | 0.50 |
| HDK N20 Fumed Silica | 15.0 | 15.0 | 10.0 | 10.0 |
| Paraplex G59 | 16.0 | 16.0 | — | — |
| Carbowax 3350 | — | — | 0.5 | 0.5 |
| AC 617A | 1.0 | 1.0 | 2.5 | 2.5 |
| Varox DBPH | 0.6 | — | — | — |
| Irganox ® 1010 | 0.25 | 0.25 | 0.5 | 0.5 |
| Tinuvin 765 | — | — | 0.25 | 0.25 |
| Ultramarine Blue | 0.002 | — | — | — |
| VANFRE AP3 | — | — | 0.5 | 0.5 |
| SR 231 | — | — | 7.5 | 3.75 |
| SR 350 | 2.0 | 7.50 | — | 3.75 |
| IRGACURE ® 819 | — | 0.375 | 0.400 | 0.375 |
| IRGACURE BP | — | 0.375 | 0.400 | 0.375 |

TABLE 2

| Property | Measurement | Unit | Comp. Ex. C1 | Ex. 1 | Ex. 1 (Tested after 1 week) | Comp. Ex C2 | Comp. Ex. C3 | Ex. 2 | Ex. 3 |
|---|---|---|---|---|---|---|---|---|---|
| Cure time/temperature | ASTM D5289 | Minutes/° C. | 3/160 | N/A | N/A | — | 7/149 | N/A | N/A |
| Post-cure, time/temperature | N/A | Hours/° C. | 4/100 | N/A | N/A | — | N/A | N/A | N/A |
| UV Exposure | N/A | Minutes | N/A | 1 | 1 | N/A | N/A | 1 | 1 |
| Hardness, Shore A | ASTM D2240 | Number | 55 | 58 | 58 | 64 | 60 | 66 | 70 |
| Tensile Strength | ASTM D412 | PSI | 3280 | 1478 | 1676 | 3067 | 2407 | 1664 | 1484 |
| Elongation | ASTM D412 | % | 585 | 385 | 396 | 492 | 535 | 466 | 320 |
| Stress at 100% Elongation | ASTM D412 | PSI | 215 | 251 | 267 | 357 | 203 | 285 | 362 |
| Tear Strength, Die C | ASTM D624 | PLI | 132 | 135 | 134 | 208 | 147 | 157 | 144 |
| Tear Strength, Die B | ASTM D624 | PLI | 180 | 182 | 196 | — | — | 234 | 178 |

The peroxide-cured product of Comparative Examples C1 and C3 exhibited good physical properties, particularly high tensile strength, but with the disadvantage of elevated temperature cure plus a post cure. Furthermore, it was impossible to produce continuous profiles which maintained their shape following extrusion. Examples 1, 2, and 3 required no high temperature cure, but only UV exposure for one minute. Continuous profiles which maintained their shape following extrusion could be easily produced. Tensile strength and elongation were somewhat lower, but hardness, and tear strength were comparable or better than the peroxide-cured product. 100 percent modulus was significantly higher as well. Comparative Example C2 is a thermoplastic polyurethane (TPU) for comparison of physical properties. Continuous profiles such as tubing could be manufactured by extrusion of the TPU at 177° C.-232° C., but blocking is problematic.

The ability to continuously extrude and cure profiles of millable polyurethane rubber with properties suitable for use in many areas is a surprising and unexpected benefit of the photocurable polyurethane rubbers of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A photocurable millable polyurethane gum composition comprising:
   a) at least one millable polyurethane polymer containing ethylenic unsaturation and having a Mooney viscosity of from 30 to 70;
   b) at least one photocatalyst; and
   c) one or more crosslinkers containing, on average per molecule, at least two ethylenically unsaturated groups, the crosslinkers present in a total amount of up to 15 weight percent based on the total weight of a) and c).

2. The photocurable millable polyurethane gum composition of claim 1, containing at least one component c) in an amount of from 0.1 to 12 weight percent, based on the sum of components a) and c).

3. The photocurable millable polyurethane gum composition of claim 1, wherein the millable polyurethane polymer contains from 0.2 to 5 weight percent of ethylenic unsaturation, calculated on the basis of allyl groups, or if allyl groups are not present, on an equivalent amount of allyl groups.

4. The photocurable millable polyurethane gum composition of claim 1, which is free of sulfur vulcanizing compounds.

5. The photocurable millable polyurethane gum composition of claim 1, which is free of peroxide crosslinkers.

6. The photocurable millable polyurethane gum of claim 1, comprising from 1 to 12 weight percent of component c) based on the weight of components a) and c), wherein the millable polyurethane polymer comprises from 0.4 to 3 weight percent ethylenic unsaturation, calculated on the basis of allyl groups, and if allyl groups are not present, on an equivalent amount of allyl groups.

7. The photocurable millable gum composition of claim 1, wherein the millable polyurethane polymer contains pendent ethylenic unsaturation.

8. A photocurable millable polyurethane gum composition comprising:
   a) at least one millable polyurethane polymer containing ethylenic unsaturation and having a Mooney viscosity of from 30 to 70;
   b) at least one photocatalyst; and
   c) one or more crosslinkers containing, on average per molecule, at least two ethylenically unsaturated groups, wherein the millable polyurethane polymer comprises a reaction product of a diisocyanate, a polytetramethylene ether glycol, and glycerol monoallyl ether.

9. A photocurable millable polyurethane gum composition comprising:
   a) at least one millable polyurethane polymer containing ethylenic unsaturation and having a Mooney viscosity of from 30 to 70;
   b) at least one photocatalyst, and
   c) one or more crosslinkers containing, on average per molecule, at least two ethylenically unsaturated groups, wherein at least a portion of the millable polyurethane polymer comprises an unsaturated polyester diol.

10. A process for molding a crosslinked polyurethane article, comprising molding a photocurable millable polyurethane gum composition of claim 1, and irradiating the photocurable millable polyurethane gum composition with UV light before, during, or after molding, to initiate crosslinking.

11. The process of claim 10, wherein the step of irradiating takes place following molding.

12. The process of claim 10, where the step of irradiating takes place for a period sufficient to produce a molded article which retains its shape following removal from a mold.

13. The process of claim 10, wherein the step of molding comprises continuous extrusion of the photocurable millable polyurethane gum composition into a continuous profile, followed by irradiating.

14. The process of claim 10, wherein following irradiating, the polyurethane molded article has a Shore A hardness of from 30 to 80.

15. The process of claim 13, wherein the photocurable millable gum composition further contains a peroxide crosslinking catalyst, and following at least partial photocuring, the profile is further peroxide cured at an elevated temperature.

16. The photocurable, millable gum of claim 1, further comprising from 0.05 to 5 weight percent of at least one non-photocurable crosslinker based on the total weight of the photocurable millable gum.

17. The photocurable, millable gum of claim 16, wherein at least one non-photocurable crosslinker is a diisocyanate or polyisocyanate.

18. The photocurable, millable gum of claim 1, wherein the photocatalyst is selected from the group consisting of phosphine oxides, benzophenones, α-hydroxy-alkyl aryl ketones, thioxanthones, anthraquinones, acetophenones, benzoins and benzoin ethers, ketals, imidazoles, phenylglyoxylic acids, and mixtures thereof.

19. The photocurable, millable gum of claim 1, wherein the crosslinker(s) c) are selected from the group consisting of allyl-functional and (meth)acrylate-functional crosslinkers.

20. An addition crosslinked polyurethane elastomer prepared by crosslinking a composition of claim 1 by exposure of the composition to UV light.

* * * * *